(12) United States Patent
Furuta et al.

(10) Patent No.: US 9,838,592 B2
(45) Date of Patent: Dec. 5, 2017

(54) LENS BARREL, IMAGING DEVICE BODY, AND IMAGING DEVICE

(71) Applicant: FUJIFILM Corporation, Tokyo (JP)

(72) Inventors: Yoshinori Furuta, Saitama (JP); Takashi Aoki, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/452,735

(22) Filed: Mar. 8, 2017

(65) Prior Publication Data
US 2017/0180631 A1   Jun. 22, 2017

Related U.S. Application Data

(63) Continuation of application No. PCT/JP2015/074047, filed on Aug. 26, 2015.

(30) Foreign Application Priority Data

Sep. 11, 2014   (JP) .................. 2014-184852

(51) Int. Cl.
| | |
|---|---|
| H04N 5/225 | (2006.01) |
| H04N 5/232 | (2006.01) |
| G02B 7/28 | (2006.01) |
| H04N 5/238 | (2006.01) |
| G06K 9/40 | (2006.01) |

(Continued)

(52) U.S. Cl.
CPC ........... *H04N 5/23212* (2013.01); *G02B 7/28* (2013.01); *H04N 5/2254* (2013.01); *H04N 5/238* (2013.01); *G02B 5/20* (2013.01); *G03B 7/18* (2013.01); *H04N 5/72* (2013.01); *H04N 2201/02493* (2013.01)

(58) Field of Classification Search
CPC ....... H04N 5/2254; H04N 2201/02493; H04N 5/72; G03B 7/18; G03B 11/00; G03B 2207/00; G02B 5/20
USPC ................................................. 348/342, 360
See application file for complete search history.

(56) References Cited

U.S. PATENT DOCUMENTS

| | | |
|---|---|---|
| 4,013,347 A | 3/1977 | Nakamura |
| 7,099,555 B2 * | 8/2006 | Onuki .................... G02B 27/58 |
| | | 250/208.1 |

(Continued)

FOREIGN PATENT DOCUMENTS

| | | |
|---|---|---|
| JP | S50142231 | 11/1975 |
| JP | H09-236740 | 9/1997 |

(Continued)

*Primary Examiner* — Ngoc-Yen Vu
(74) *Attorney, Agent, or Firm* — JCIPRNET (57) ABSTRACT

There are provided a lens barrel, an imaging device body, and an imaging device that can reduce a deviation in a blurred image of oblique luminous flux caused by an APD filter.

A lens barrel includes a first lens optical system and a second lens optical system serving as lens optical systems including focus lenses, a diaphragm that changes the amount of an incident ray and emits the incident ray, a first APD filter that is disposed on a light-incident side of the diaphragm, and a second APD filter that is disposed on a light-emitting side of the diaphragm. Since the amount of a reduced upper ray L1 of oblique luminous flux and the amount of a reduced lower ray L2 thereof are made to be substantially equal to each other by the first APD filter and the second APD filter, a deviation of a blurred image is reduced.

7 Claims, 11 Drawing Sheets

(51) Int. Cl.
  *G03B 7/18*  (2006.01)
  *H04N 5/72*  (2006.01)
  *G02B 5/20*  (2006.01)

(56) References Cited

U.S. PATENT DOCUMENTS

| | | | | |
|---|---|---|---|---|
| 7,280,206 | B2* | 10/2007 | Wildnauer | G02B 27/58 356/328 |
| 7,681,172 | B2* | 3/2010 | Zhang | G03F 7/70216 430/30 |
| 8,351,134 | B2* | 1/2013 | Shinohara | G03B 11/00 359/738 |
| 9,651,722 | B2* | 5/2017 | Ito | G02B 5/20 |
| 2006/0038966 | A1* | 2/2006 | Long | G03B 21/006 353/97 |
| 2015/0177533 | A1* | 6/2015 | Ono | G02B 13/004 348/342 |
| 2016/0341973 | A1* | 11/2016 | Ida | G02B 27/58 |

FOREIGN PATENT DOCUMENTS

| | | |
|---|---|---|
| JP | H10-268382 | 10/1998 |
| JP | 2012-128151 | 7/2012 |

* cited by examiner

LENS BARREL, IMAGING DEVICE BODY, AND IMAGING DEVICE

CROSS-REFERENCE TO RELATED APPLICATION

This application is a Continuation of PCT International Application PCT/JP2015/074047 filed on 26 Aug. 2015, which claims priority under 35 USC 119(a) from Japanese Patent Application No. 2014-184852 filed on 11 Sep. 2014. The above application is hereby expressly incorporated by reference, in its entirety, into the present application.

BACKGROUND OF THE INVENTION

1. Field of the Invention

The present invention relates to a lens barrel, an imaging device body, and an imaging device that include an apodization filter.

2. Description of the Related Art

There is known an imaging device that includes an apodization filter (hereinafter, referred to as an APD filter) having optical characteristics in which light transmittance is reduced as a distance from an optical axis is increased (see JP1997-236740A (JP-H09-236740A) and JP2012-128151A). The APD filter reduces the amount of a ray around only a blurred image (spotlight blurring or the like), which is out of focus, without reducing the amount of a ray around an image plane. Accordingly, the APD filter realizes a beautiful blur by applying gradation to the profile of the blurred image.

In the imaging device including the APD filter, the APD filter is disposed near a diaphragm (see JP-H09-236740A) and JP2012-128151A). In JP1997-236740A (JP-H09-236740A), the APD filter is disposed near the diaphragm on the light-incident side or the light-emitting side of the diaphragm in order to reduce the vignetting of a ray deviating from the optical axis. In JP2012-128151A, the APD filter is disposed near the diaphragm on the light-emitting side of the diaphragm in order to reduce the dependency of an angle with respect to the optical axis of luminous flux of incident rays on the effect of the APD filter.

Since the APD filter cannot be disposed at the same position as the diaphragm in principle even though the APD filter is disposed near the diaphragm as disclosed in JP1997-236740A (JP-H09-236740A) and JP2012-128151A, the APD filter is disposed at a position that is shifted from the diaphragm in the direction of the optical axis. In a case in which incident luminous flux is parallel to the optical axis, an upper ray and a lower ray of the luminous flux (parallel luminous flux) are incident on positions of the APD filter that have the same light transmittance. Accordingly, the APD filter uniformly applies gradation to the profile of a blurred image. In contrast, in a case in which incident luminous flux is not parallel to the optical axis, an upper ray and a lower ray of the luminous flux (oblique luminous flux) are incident on positions of the APD filter that have different light transmittances. Accordingly, the APD filter non-uniformly applies gradation to the profile of a blurred image. As a result, a deviation is generated in the blurred image.

Figure 11:
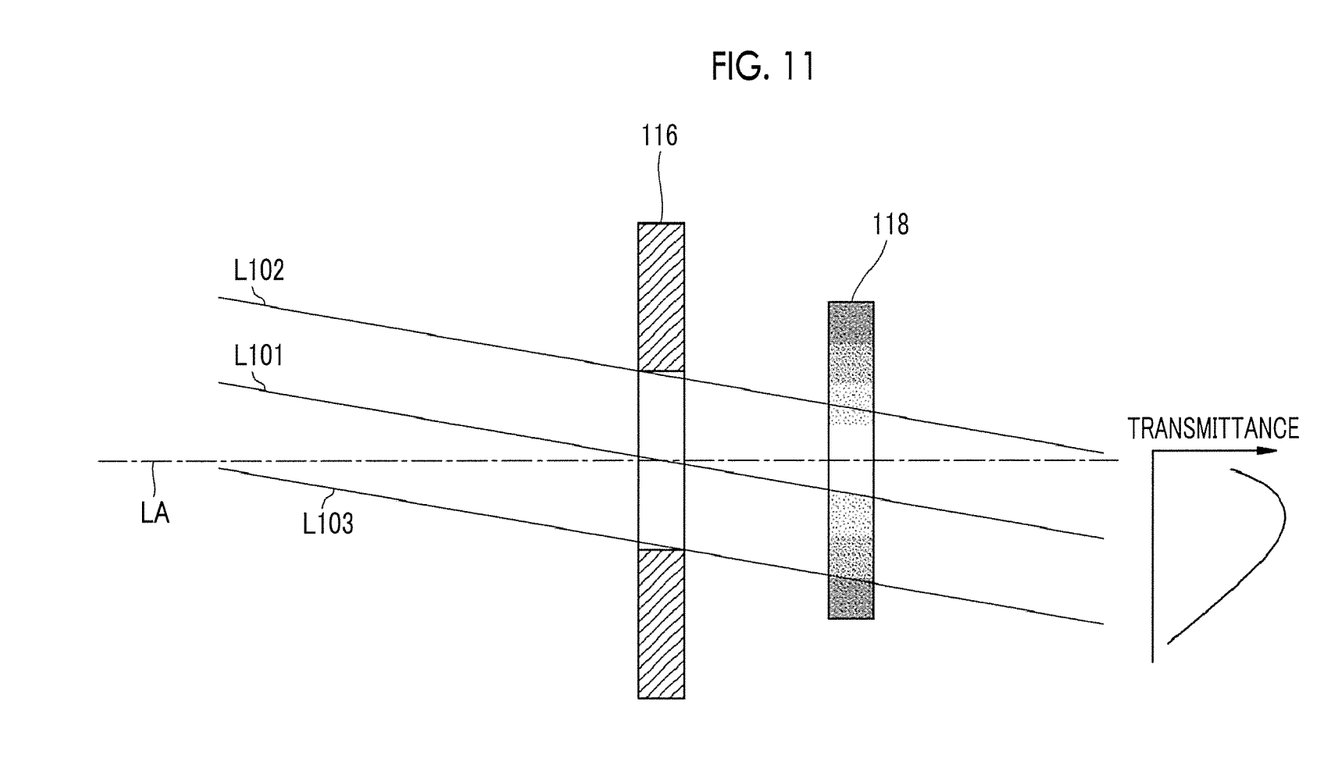
FIG. 11 is a view showing the amount of a ray of oblique luminous flux that is reduced by an APD filter in the related art.

The generation of a deviation in a blurred image in the case of oblique luminous flux will be described with reference to FIG. 11. In FIG. 11, an APD filter 118 is disposed on the light-emitting side of a diaphragm 116 and oblique luminous flux, which is obliquely incident on the diaphragm 116 from the upper side of an optical axis, is shown.

In this case, an upper ray L102, which passes through an upper end of the aperture portion of the diaphragm 116, passes through a position that is closer to the center of the APD filter 118 than the position through which an upper ray of parallel luminous flux passes. On the other hand, a lower ray L103, which passes through a lower end of the aperture portion of the diaphragm 116, passes through a position that is more distant from the center of the APD filter 118 than the position through which a lower ray of parallel luminous flux passes. The center of the APD filter 118 corresponds to the optical axis and the light transmittance of the APD filter 118 is reduced as a distance from the center of the APD filter 118 is increased. Accordingly, the amount of the upper ray L102 reduced by the APD filter 118 is smaller than the amount of the lower ray L103 reduced by the APD filter 118. Accordingly, a deviation is generated in a blurred image of the oblique luminous flux in a vertical direction.

SUMMARY OF THE INVENTION

An object of the invention is to provide a lens barrel, an imaging device body, and an imaging device that can reduce a deviation of a blurred image of oblique luminous flux caused by an APD filter.

A lens barrel of the invention comprises a lens optical system, a diaphragm, a first APD filter, and a second APD filter. The lens optical system includes a focus lens forming an image with an incident ray. The diaphragm changes the amount of the incident ray and emits the incident ray. The first APD filter is disposed on a light-incident side of the diaphragm. The second APD filter is disposed on a light-emitting side of the diaphragm.

It is preferable that the first and second APD filters have optical characteristics in which light transmittance is reduced toward an outer peripheral portion from an optical axis and the optical characteristics of the first APD filter are the same as the optical characteristics of the second APD filter. It is preferable that a first optical distance between the diaphragm and the first APD filter is equal to a second optical distance between the diaphragm and the second APD filter.

Not only a case in which a component of the lens optical system is present between the first and second APD filters but also a case in which a component of the lens optical system is not present between the first and second APD filters is preferable.

Further, it is preferable that two sets of the first and second APD filters are provided, a component of the lens optical system is not present between one set of the first and second APD filters, and a component of the lens optical system is present between the other set of the first and second APD filters.

It is preferable that the lens barrel further comprises a filter insertion/retreat unit in a case in which the lens barrel comprises two sets of the first and second APD filters. The filter insertion/retreat unit inserts and retreats each of one set of the first and second APD filters and the other set of the first and second APD filters. Alternatively, it is preferable that each of one set of the first and second APD filters and the other set of the first and second APD filters is an APD filter of which optical characteristics are changed by a change in shape, and the lens barrel further comprises a shape changing unit provided for each APD filter and changing the shape of each APD filter.

The lens barrel is detachably mounted on an imaging device body of the invention, and the imaging device body comprises an imaging element that generates an imaging signal by photoelectrically converting a ray having passed through the first and second APD filters.

An imaging device of the invention comprises the lens barrel and the imaging device body.

Further, an imaging device of the invention comprises a lens optical system, a diaphragm, a first APD filter, a second APD filter, and an imaging element. The lens optical system includes a focus lens forming an image with an incident ray. The diaphragm changes the amount of the incident ray and emits the incident ray. The first APD filter is disposed on a light-incident side of the diaphragm. The second APD filter is disposed on a light-emitting side of the diaphragm. The imaging element generates an imaging signal by photoelectrically converting a ray having passed through the first and second APD filters.

According to the invention, since an upper ray and a lower ray can be reduced without a deviation by a first APD filter disposed on the light-incident side of a diaphragm and a second APD filter disposed on the light-emitting side of the diaphragm, a deviation in blurring caused by the APD filters can be suppressed.

DESCRIPTION OF THE PREFERRED EMBODIMENTS

First Embodiment

Figure 1:
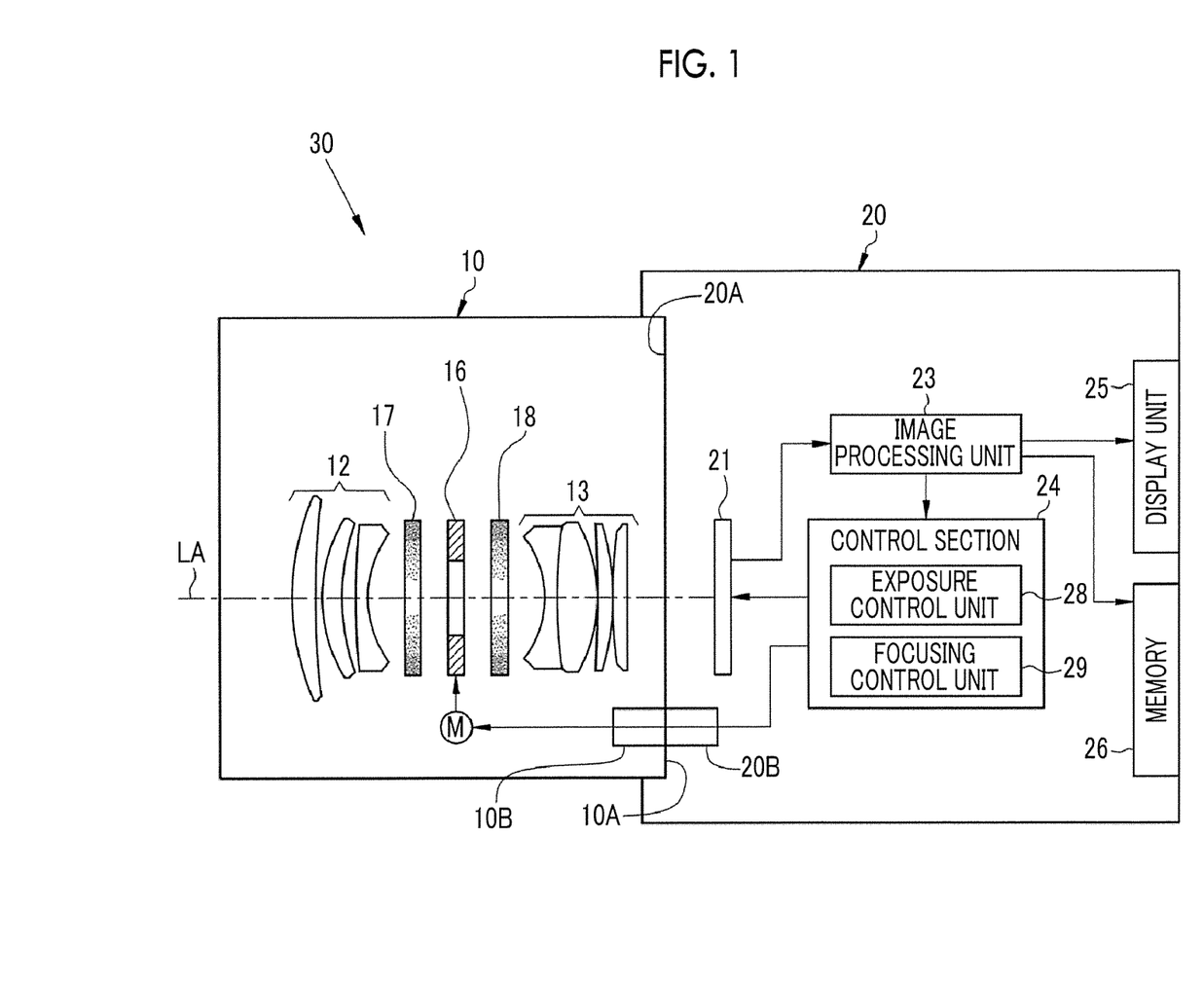
FIG. 1 is a diagram showing the configuration of an imaging device.

In FIG. 1, a lens barrel 10 of a first embodiment of the invention is detachably mounted on an imaging device body 20, and the lens barrel 10 and the imaging device body 20 are used as an imaging device 30. In the event that a base end portion 10A of the lens barrel 10 is mounted on a lens barrel mounting portion 20A of the imaging device body 20, the lens barrel 10 and the imaging device body 20 are connected to each other. The base end portion 10A and the lens barrel mounting portion 20A are provided with electrical contacts 10B and 20B, respectively. The lens barrel 10 and the imaging device body 20 are electrically connected to each other through the electrical contacts 10B and 20B.

The lens barrel 10 includes a first lens optical system 12, a second lens optical system 13, a diaphragm 16, a first apodization filter (APD filter) 17, and a second APD filter 18. All of the first lens optical system 12, the second lens optical system 13, the diaphragm 16, the first APD filter 17, and the second APD filter 18 are disposed on an optical axis LA of the lens barrel 10.

Each of the first and second lens optical systems 12 and 13 includes a focus lens that forms an image with an incident ray. The first lens optical system 12 is disposed closer to the light-incident side than the second lens optical system 13. The diaphragm 16 is disposed between the first and second lens optical systems 12 and 13. The diaphragm 16 changes the amount of an incident ray, and emits the ray.

The first APD filter 17 is disposed between the first lens optical system 12 and the diaphragm 16. The second APD filter 18 is disposed between the diaphragm 16 and the second lens optical system 13. Only the diaphragm 16 is present between the first and second APD filters 17 and 18, and other components are not present between the first and second APD filters 17 and 18.

The imaging device body 20 includes an imaging element 21, an image processing unit 23, a control section 24, a display unit 25, and a memory 26. The imaging element 21 generates imaging signals by photoelectrically converting an incident ray entering from the lens barrel 10. The imaging signals are output to the image processing unit 23. The imaging element 21 is, for example, a CMOS (Complementary Metal Oxide Semiconductor) image sensor or a CCD (Charge Coupled Device) image sensor, and can control an electronic shutter speed.

The image processing unit 23 generates a photographed image from the imaging signals, and outputs the photographed image to the display unit 25 and the memory 26. The display unit 25 displays the photographed image that is input from the image processing unit 23. The memory 26 stores the photographed image that is input from the image processing unit 23. Further, the image processing unit 23 supplies a brightness signal, which is obtained from the imaging signal by the Y/C conversion or the like, to the control section 24.

The control section 24 includes an exposure control unit 28 and a focusing control unit 29. The exposure control unit 28 calculates a photometric value (performs photometry) on the basis of the brightness signal that is supplied from the image processing unit 23. The exposure control unit 28 obtains an appropriate exposure value by performing predetermined calculation on the basis of the calculated photometric value. The exposure control unit 28 determines a set of an imaging diaphragm value and an imaging shutter speed on the basis of this appropriate exposure value. The exposure control unit 28 sets an imaging exposure by setting the imaging diaphragm value and the imaging shutter speed on the diaphragm 16 and the imaging element 21, respectively.

A substantial diaphragm value, which is corrected in consideration of not a diaphragm value determined depending on the effective aperture diameter of the diaphragm 16 but the light transmittance of the first and second APD filters 17 and 18 in an effective aperture region, is used for the determination of an imaging exposure that is performed by the exposure control unit 28. The light transmittance in the effective aperture region is calculated by the product of the light transmittance $T_1$ of the first APD filter 17 and the light transmittance $T_2$ of the second APD filter 18 in the effective aperture region.

The focusing control unit 29 performs auto-focusing control. The focusing control unit 29 determines a focus search range that is a range in which a focus position is searched and a search interval that is an interval at which a focus position is searched. The focusing control unit 29 determines focusing evaluation positions on the basis of the focus search range and the search interval.

The focusing control unit 29 moves all or a part of the first and second lens optical systems 12 and 13 to the respective focusing evaluation positions and acquires focusing evaluation values from the image processing unit 23 at the respective focusing evaluation positions. High-frequency components are extracted from the imaging signals and are integrated, so that the focusing evaluation values are obtained. The focusing control unit 29 detects a focus position where the focusing evaluation value is largest from the focusing evaluation values, which are obtained at the respective focusing evaluation positions, and sets the positions of the first and second lens optical systems 12 and 13 to the detected focus position.

The focusing control unit 29 can focus on a near subject from a subject, which is positioned at infinity, by feeding the first and second lens optical systems 12 and 13 and moving the second lens optical system 13.

Since the diaphragm 16, which is provided in the lens barrel 10, is disposed substantially in the middle of a gap between the first and second APD filters 17 and 18, a distance (a first distance) between the first APD filter 17 and the diaphragm 16 is equal to a distance (a second distance) between the diaphragm 16 and the second APD filter 18. Here, the fact that the first and second distances are equal to each other means that a difference between the first and second distances is 10% or less of the first or second distance, preferably means that the difference therebetween is 5% or less of the first or second distance, and more preferably means that the difference therebetween is 3% or less of the first or second distance.

Figure 4:
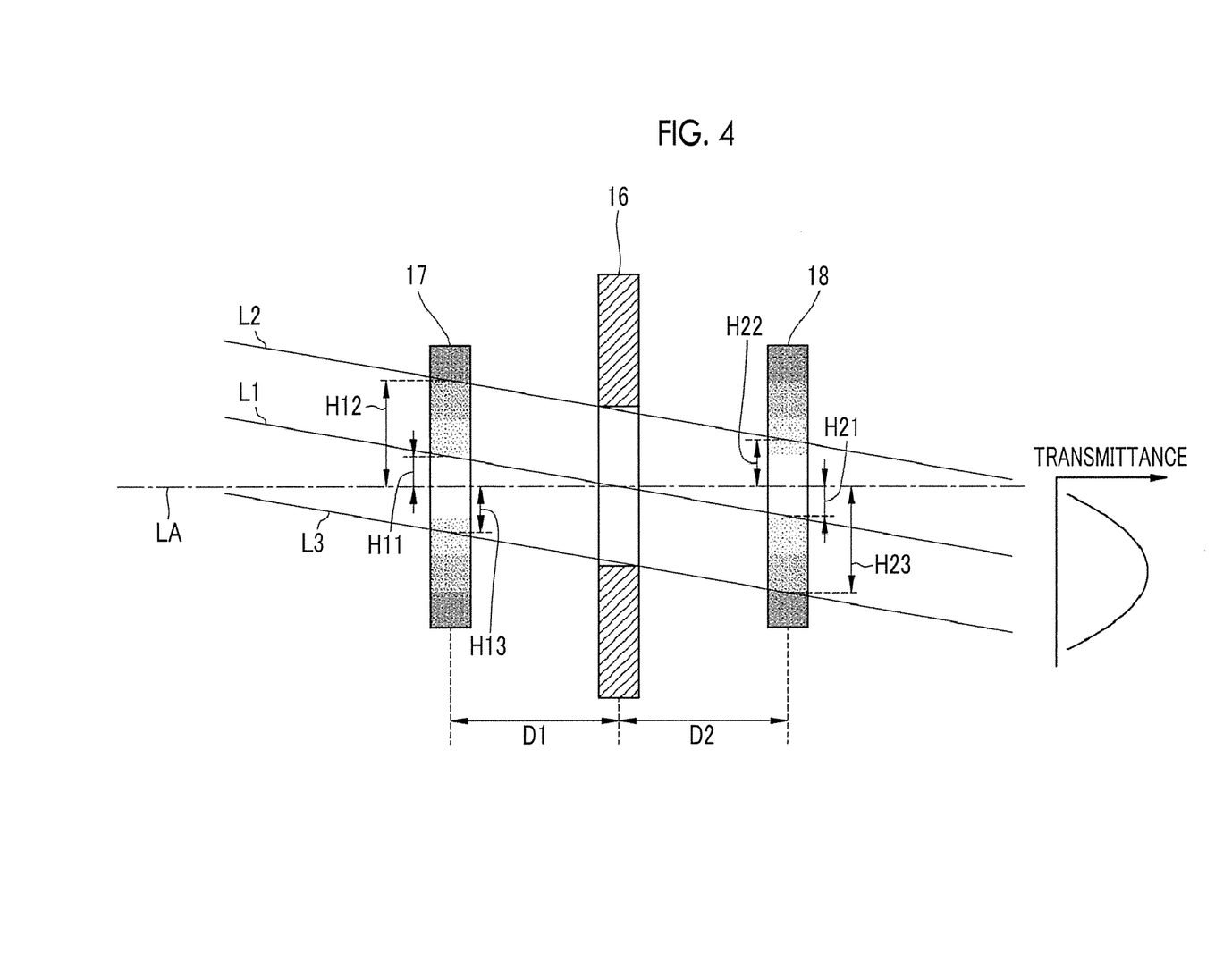
FIG. 4 is a view showing the amount of a ray of oblique luminous flux that is reduced by first and second APD filters.

Further, since the components of the lens optical systems are not present between the first and second APD filters 17 and 18, an optical distance (a first optical distance) D1 between the first APD filter 17 and the diaphragm 16 is equal to the first distance and an optical distance (a second optical distance) D2 between the diaphragm 16 and the second APD filter 18 is equal to the second distance as shown in FIG. 4.

Figure 2:
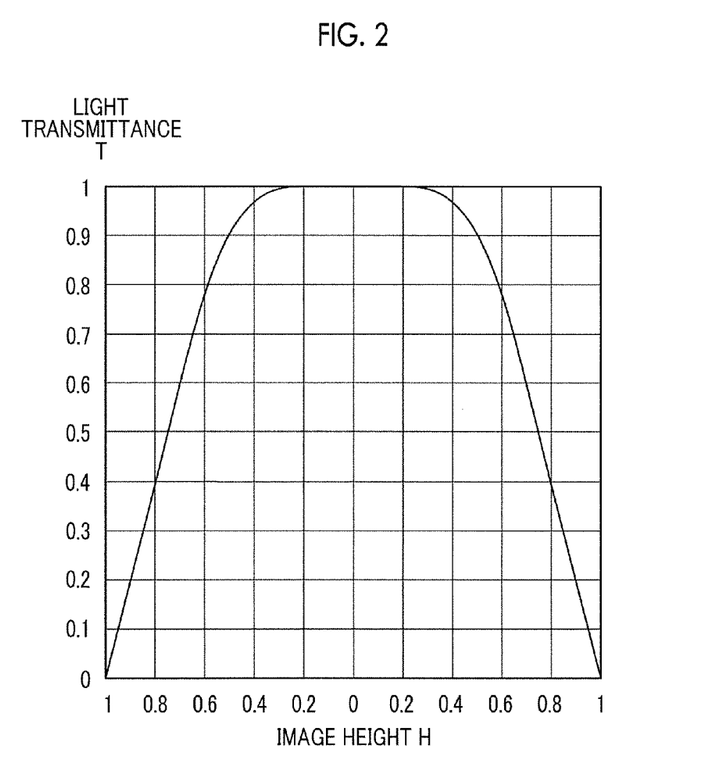
FIG. 2 is a graph showing the optical characteristics of an APD filter.

The optical characteristics of the first APD filter 17 are the same as the optical characteristics of the second APD filter 18. As shown in FIG. 2, the first and second APD filters 17 and 18 have optical characteristics in which light transmittance T is reduced as a distance from the optical axis LA is increased toward the outer peripheral portion of each APD filter (as an image height H is increased). That is, the amount of a reduced light, which is incident on the first and second APD filters 17 and 18, is increased as the image height H is increased.

Here, the fact that the optical characteristics of the first APD filter 17 are the same as the optical characteristics of the second APD filter 18 means that a difference between the light transmittance of the first APD filter 17 and the light transmittance of the second APD filter 18 is 10% or less of the light transmittance of the first or second APD filter 17 or 18, preferably means that the difference therebetween is 5% or less of the light transmittance of the first or second APD filter 17 or 18, and more preferably means that the difference therebetween is 3% or less of the light transmittance of the first or second APD filter 17 or 18, at an arbitrary image height.

The total light transmittance of the first and second APD filters 17 and 18 is calculated by the product of the light transmittance $T_1$ of the first APD filter 17 and the light transmittance $T_2$ of the second APD filter 18 on the light path of an incident ray. Here, the light transmittance $T_1$ and the light transmittance $T_2$ on the light path have different values in regard to an incident ray (oblique luminous flux) passing through the lens barrel 10 so as to be oblique to the optical axis LA.

Next, since the first and second lens optical systems 12 and 13 deviate from the focus position, the light-reducing effects of the first and second APD filters 17 and 18, which are obtained in a case in which a blurred image is generated, will be described with reference to FIGS. 3 and 4.

Figure 3:
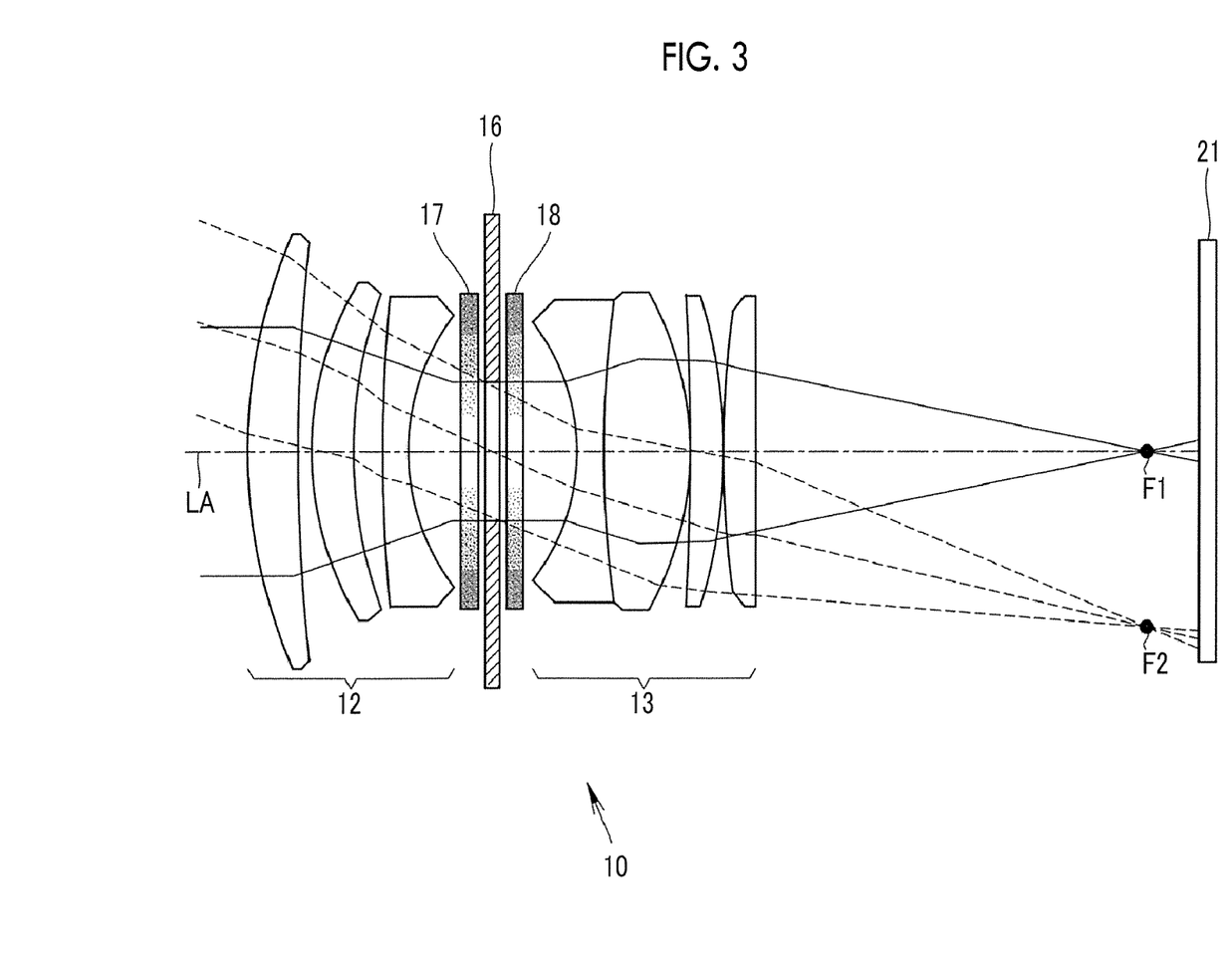
FIG. 3 is a view showing the light path of parallel luminous flux and the light path of oblique luminous flux.

In FIG. 3, the luminous flux (parallel luminous flux) of incident rays parallel to the optical axis LA forms an image at a point F1 on the optical axis LA. Since an upper ray of the parallel luminous flux is incident on a position where light transmittance is equal to the light transmittance T of the first APD filter 17 and a lower ray of the parallel luminous flux is incident on a position where light transmittance is equal to the light transmittance of the second APD filter 18, the amount of a ray reduced by the first APD filter 17 and the amount of a ray reduced by the second APD filter 18 are equal to each other. Accordingly, a deviation is not generated in a blurred image that is generated by the parallel luminous flux.

The luminous flux (oblique luminous flux) of incident rays, which are incident so as to be oblique to the optical axis LA from the top, forms an image at a point F2 that deviates from the optical axis LA. Specifically, as shown in FIG. 4, a main ray L1 of the oblique luminous flux passes through a portion of the first APD filter 17 that is distant from the optical axis LA by a distance H11 and a portion of the second APD filter 18 that is distant from the optical axis LA by a distance H21. An upper ray L2 passes through a portion of the first APD filter 17 that is distant from the optical axis LA by a distance H12 and a portion of the second APD filter 18 that is distant from the optical axis LA by a distance H22. A lower ray L3 passes through a portion of the first APD filter 17 that is distant from the optical axis LA by a distance H13 and a portion of the second APD filter 18 that is distant from the optical axis LA by a distance H23.

The distance H12 and the distance H23 are equal to each other, and the distance H13 and the distance H22 are equal to each other. Since the optical characteristics of the first APD filter 17 are the same as the optical characteristics of the second APD filter 18 and the first optical distance D1 and the second optical distance D2 are equal to each other, the transmittances of the APD filters satisfy relational equations expressed by Equation (1) and Equation (2).

$$T_1(H12)=T_2(H23) \quad \text{Equation (1)}$$

$$T_2(H22)=T_1(H13) \quad \text{Equation (2)}$$

Here, $T_1(H)$ denotes the light transmittance of the first APD filter 17 at the image height H. $T_2(H)$ denotes the light transmittance of the second APD filter 18 at the image height H.

Equation (3) is derived from Equation (1) and Equation (2). The left side of Equation (3) represents the transmittance of the first and second APD filters 17 and 18 on the light path of the upper ray L2, and the right side thereof represents the transmittance of the first and second APD filters 17 and 18 on the light path of the lower ray L3.

$$T_1(H12) \times T_2(H22) = T_1(H13) \times T_2(H23) \quad \text{Equation (3)}$$

That is, since the amount of the reduced upper ray L2 and the amount of the reduced lower ray L3 are equal to each other, a deviation is not generated in a blurred image that is generated by the oblique luminous flux.

Since the diaphragm 16 is disposed between the first and second APD filters 17 and 18 as described above, the amount of an upper ray reduced by the first APD filter 17 is equal to the amount of a lower ray reduced by the second APD filter 18 regardless of an angle between incident luminous flux and the optical axis LA. For this reason, a beautiful blurred image is obtained in the imaging device 30 regardless of an angle between incident luminous flux and the optical axis LA.

The first distance and the second distance have been equal to each other, the first optical distance D1 and the second optical distance D2 have been equal to each other, and the optical characteristics of the first APD filter 17 have been the same as the optical characteristics of the second APD filter 18 in the first embodiment; but the invention is not limited to this aspect. The first and second distances, the first and second optical distances D1 and D2, and the optical characteristics of the first and second APD filters 17 and 18 may be appropriately designed so that the amount of the reduced upper ray of the oblique luminous flux is equal to the amount of the reduced lower ray thereof.

For example, the various distances and the optical characteristics, which have been described above, may be appropriately designed so that an upper ray and a lower ray are optically symmetrical to each other with respect to a point positioned on the diaphragm 16 and the optical axis LA in a region between the first and second APD filters 17 and 18. Here, the fact that the amount of the reduced upper ray and the amount of the reduced lower ray are substantially equal to each other means that a difference between the amount of the reduced upper ray and the amount of the reduced lower ray is 10% or less of the amount of the reduced upper ray or the reduced lower ray, preferably means that the difference therebetween is 5% or less of the amount of the reduced upper ray or the reduced lower ray, and more preferably means that the difference therebetween is 3% or less of the amount of the reduced upper ray or the reduced lower ray.

Further, it has been possible to focus on a near subject from a subject, which is positioned at infinity, by feeding the first and second lens optical systems 12 and 13 and moving the second lens optical system 13 in the first embodiment, but the invention is not limited to this aspect and can also use any focusing method. For example, a method of detecting a phase difference using phase-difference pixels can be used.

Furthermore, the upper ray and the lower ray of the first embodiment are rays that are positioned at end portions of the luminous flux regulated by the diaphragm 16, but the upper ray and the lower ray are the same even in a case in which the luminous flux is regulated by the first and second lens optical systems 12 and 13.

Figure 5:
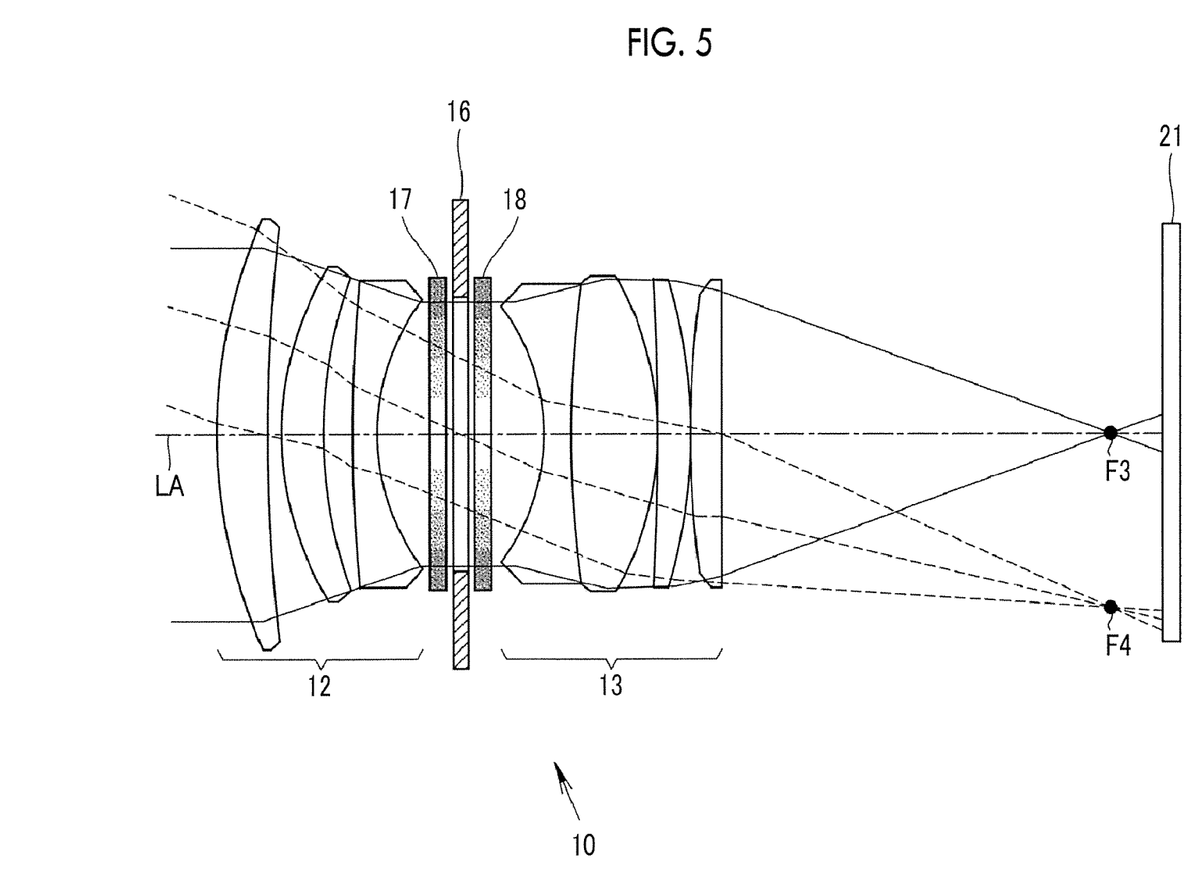
FIG. 5 is a view showing the light path of parallel luminous flux and the light path of oblique luminous flux that are regulated by first and second lens optical systems.

In a case in which the diaphragm is close to the open state, the light path of an incident ray is regulated by not the diaphragm 16 but the first and second lens optical systems 12 and 13 as shown in FIG. 5. Parallel luminous flux forms an image at a point F3 on the optical axis LA. Since the amount of the reduced upper ray of the parallel luminous flux and the amount of the reduced lower ray thereof are equal to each other as in the first embodiment, a deviation is not generated in a blurred image that is generated by the parallel luminous flux.

Oblique luminous flux forms an image at a point F4 that deviates from the optical axis LA. An upper ray of the oblique luminous flux is regulated by the first lens optical system 12, and a lower ray thereof is regulated by the second lens optical system 13. Since the amount of the reduced upper ray and the amount of the reduced lower ray are equal to each other as in the first embodiment in a case in which a main ray passes through a portion of the diaphragm near the optical axis LA, a deviation is not generated in a blurred image. It is preferable that the first and second lens optical systems 12 and 13 are designed so that the main ray of the oblique luminous flux passes through a portion of the diaphragm near the optical axis LA.

Second Embodiment

Components of the lens optical systems are not interposed between the diaphragm 16 and the first APD filter 17 and between the diaphragm 16 and the second APD filter 18 in the first embodiment, but components of the lens optical system may be interposed at least one of between the diaphragm 16 and the first APD filter 17 and between the diaphragm 16 and the second APD filter 18.

Figure 6:
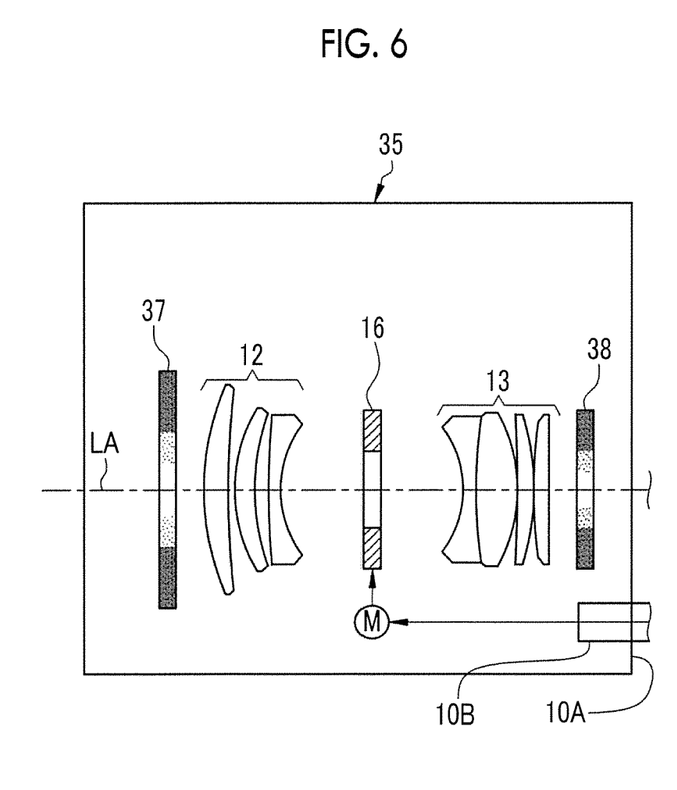
FIG. 6 is a diagram showing the configuration of a lens barrel of a second embodiment.

In FIG. 6, a lens barrel 35 of a second embodiment includes a first APD filter 37 and a second APD filter 38. The first APD filter 37 is disposed on the light-incident side of a first lens optical system 12. The second APD filter 38 is disposed on the light-emitting side of a second lens optical system 13. That is, the first lens optical system 12 is interposed between a diaphragm 16 and the first APD filter 37, and the second lens optical system 13 is interposed between the diaphragm 16 and the second APD filter 38. In the second embodiment, a first distance that is an actual distance between the diaphragm 16 and the first APD filter 37 is different from a first optical distance D1. Likewise, a second distance that is an actual distance between the diaphragm 16 and the second APD filter 38 is different from a second optical distance D2.

The first APD filter 37 is larger than the second APD filter 38. The size of the first APD filter 37 is determined according to the size of the incident surface of the lens barrel 35 or the size of the first lens optical system 12. A ratio of the size (diameter) of the first APD filter 37 to the size of the second APD filter 38 is substantially equal to a ratio of the first optical distance D1 to the second optical distance D2.

Figure 7:
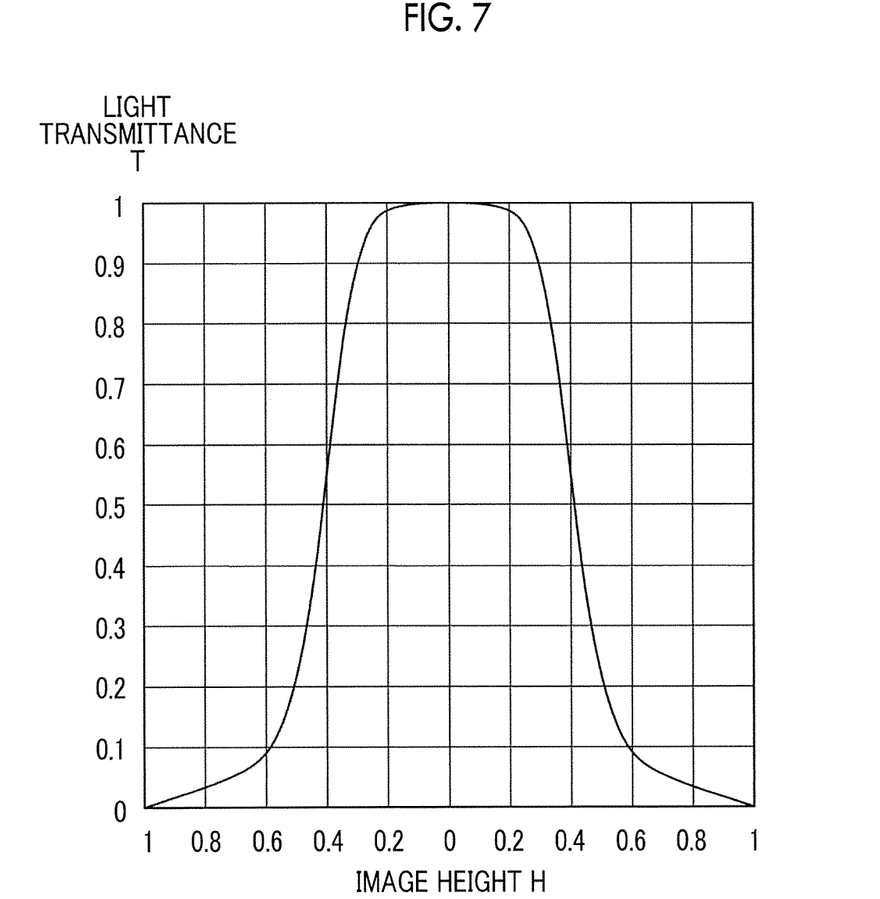
FIG. 7 is a view showing the optical characteristics of an APD filter of the second embodiment.

The optical characteristics of the first APD filter 37 and the optical characteristics of the second APD filter 38 are similar to each other, and the first APD filter 37 and the second APD filter 38 have optical characteristics shown in FIG. 7. Here, the fact that the optical characteristics of the APD filters are similar to each other means that the first APD filter 37 and the second APD filter 38 correspond to each other in terms of the distribution of light transmittance T obtained in the event that a radius where the light transmittance of the APD filter is "0" is standardized as an image height "1".

The rate of change of light transmittance T between a region (high-transmittance region), which has high light transmittance T and is positioned near an optical axis, and a region (low-transmittance region), which has low light transmittance T and is positioned at an outer peripheral portion distant from the optical axis, of each of the first and second APD filters 37 and 38 of the second embodiment is higher than that of each of the first and second APD filters 17 and 18 of the first embodiment. That is, each of the first and second APD filters 37 and 38 of the second embodiment is formed of an APD filter (hereinafter, referred to as a dichotomized filter) that is substantially divided into the high-transmittance region and the low-transmittance region.

Since other structures of the second embodiment are the same as those of the first embodiment, the detailed description thereof will be omitted.

Figure 8:
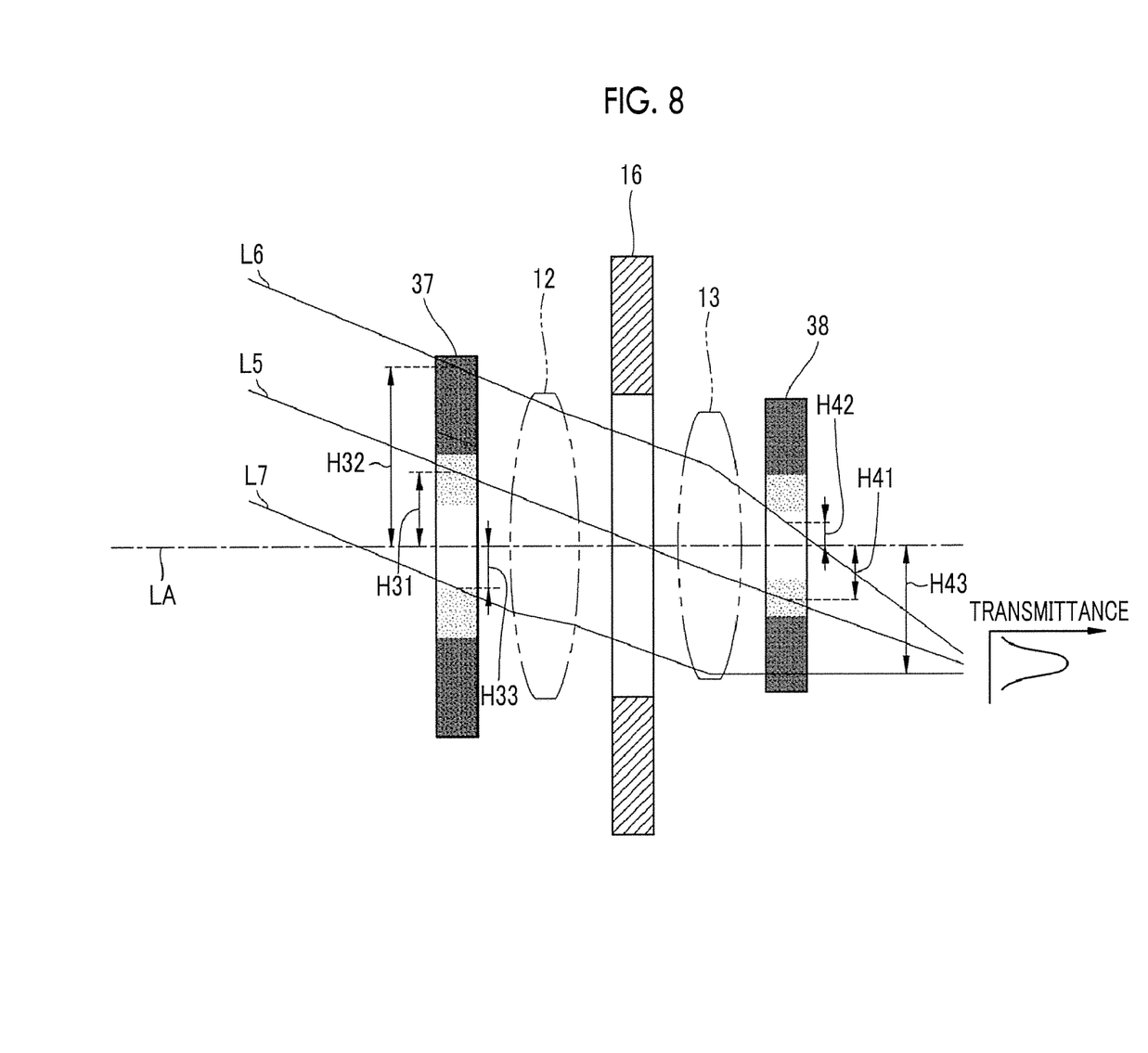
FIG. 8 is a view showing the amount of a ray of oblique luminous flux that is reduced by first and second APD filters of the second embodiment.

Oblique luminous flux, which is regulated by the first and second lens optical systems 12 and 13 and is inclined with respect to an optical axis LA from above at an inclination angle, will be described with reference to FIG. 8. An upper ray L6 of the oblique luminous flux is regulated by the first lens optical system 12 and a lower ray L7 thereof is regulated by the second lens optical system 13. The oblique luminous flux passes through a substantially upper region of the first APD filter 37; passes through the first lens optical system 12, the diaphragm 16, and the second lens optical system 13 in this order; and passes through a substantially lower region of the second APD filter 38.

A main ray L5 of the oblique luminous flux passes through a portion (high-transmittance region) of the first APD filter 37, which is distant from the optical axis LA by a distance H31, and a portion (high-transmittance region) of the second APD filter 38, which is distant from the optical axis LA by a distance H41, in this order. The main ray L5 passes through regions, which are positioned near the optical axis and have high light transmittance T, of both the first and second APD filters 37 and 38.

The upper ray L6 of the oblique luminous flux passes through a portion (low-transmittance region) of the first APD filter 37, which is distant from the optical axis LA by a distance H32, and a portion (high-transmittance region) of the second APD filter 38, which is distant from the optical axis LA by a distance H42, in this order. The lower ray L7 of the oblique luminous flux passes through a portion (high-transmittance region) of the first APD filter 37, which is distant from the optical axis LA by a distance H33, and a portion (low-transmittance region) of the second APD filter 38, which is distant from the optical axis LA by a distance H43, in this order. Since each of the upper ray L6 and the lower ray L7 passes through the low-transmittance region and the high-transmittance region once, the amount of the reduced upper ray L6 and the amount of the reduced lower ray L7 are equal to each other. Accordingly, a deviation is not generated in a blurred image that is generated by the oblique luminous flux.

Since the first APD filter 37 is disposed closest to an end of the lens barrel 35 and the second APD filter 38 is disposed closest to a base end of the lens barrel 35 in the second embodiment, the upper ray L6 and the lower ray L7 can be reduced equally even in a case in which the main ray L5 of the oblique luminous flux passes through a portion of the diaphragm deviating from the vicinity of the optical axis LA. Since the main ray L5 of the oblique luminous flux is likely to deviate from a portion of the diaphragm 16 in the vicinity of the optical axis LA as the first and second lens optical systems 12 and 13 are moved by a focusing operation or the like, the second embodiment is effective in a case in which a subject present at an extreme position, such as a subject present substantially at infinity or a near subject, is focused.

A case in which a subject present at an extreme position, such as a subject present substantially at infinity or a near subject, is focused is a case in which an imaging magnification is extremely low or extremely high. Oblique luminous flux, which passes through the substantially upper region of the first APD filter 37, passes through the substantially lower region of the second APD filter 38, and has a large inclination angle with respect to the optical axis LA, is incident in this case. Since the above-mentioned dichotomized filter has been used as each of the first and second APD filters 37 and 38 in the second embodiment, it is possible to more reliably and significantly reduce the upper ray L6 and the lower ray L7 than the main ray L5 even in the case of oblique luminous flux having a large inclination angle with respect to the optical axis LA.

Third Embodiment

Figure 9:
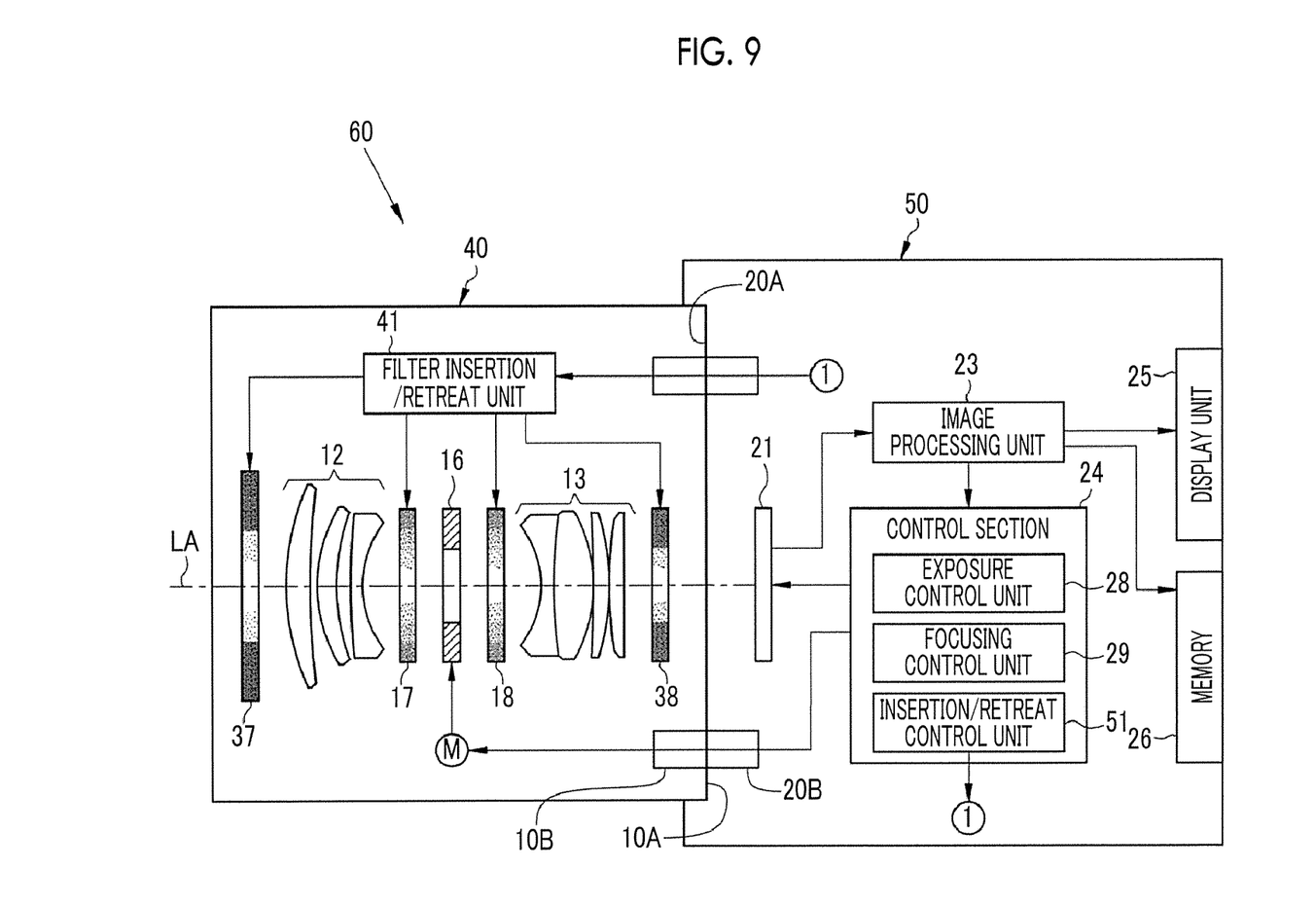
FIG. 9 is a view showing the configuration of an imaging device of a third embodiment.

A combination of a set of APD filters of the first embodiment (the first and second APD filters 17 and 18) and a set of APD filters of the second embodiment (the first and second APD filters 37 and 38) may be used. As shown in FIG. 9, a lens barrel 40 of a third embodiment includes both the same set of APD filters as those of the first embodiment and the same set of APD filters as those of the second embodiment.

The lens barrel 40 includes a filter insertion/retreat unit 41. The filter insertion/retreat unit 41 inserts and retreats the APD filters 17 and 18 and the APD filters 37 and 38. The filter insertion/retreat unit 41 can take a first insertion state where the APD filters 17 and 18 are simultaneously inserted and a second insertion state where the APD filters 37 and 38 are simultaneously inserted.

An imaging device body 50 of the third embodiment has a structure in which an insertion/retreat control unit 51 is added into the control section 24 of the imaging device body 20 of the first embodiment. The insertion/retreat control unit 51 controls the insertion/retreat of the APD filters performed by the filter insertion/retreat unit 41. The lens barrel 40 is detachably mounted on the imaging device body 50, and the lens barrel 40 and the imaging device body 50 are used as an imaging device 60 of the third embodiment. Since other structures of the third embodiment are the same as those of the first or second embodiment, the detailed description thereof will be omitted.

The insertion/retreat control unit 51 switches the first insertion state and the second insertion state according to the diaphragm value of the diaphragm 16 or an imaging magnification. Since the second insertion state is preferable in a case in which the diaphragm value of the diaphragm 16 is close to an open value and an imaging magnification is extremely low or extremely high, the insertion/retreat control unit 51 controls the insertion/retreat of the APD filters so that the second insertion state is made. In other cases, the insertion/retreat control unit 51 controls the insertion/retreat of the APD filters so that the first insertion state is made.

The control method of the insertion/retreat control unit 51 using the filter insertion/retreat unit 41 is not limited thereto, and can be appropriately determined according to the characteristics of the first APD filter 17, the second APD filter 18, the first APD filter 37, the second APD filter 38, the first lens optical system 12, and the second lens optical system 13.

Fourth Embodiment

Figure 10:
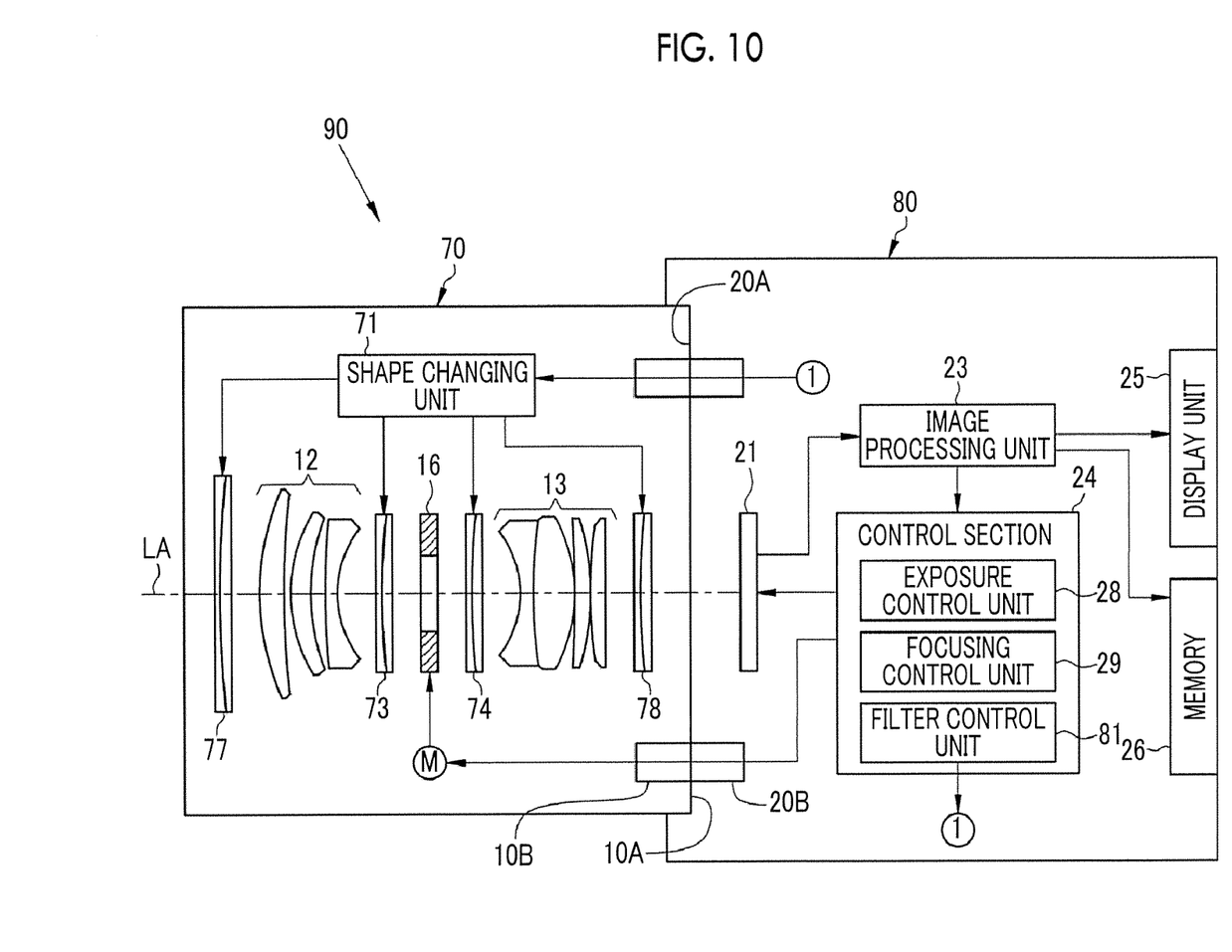
FIG. 10 is a view showing the configuration of an imaging device of a fourth embodiment.

The APD filters having unique optical characteristics have been used in the third embodiment, but APD filters having variable optical characteristics may be used. As shown in FIG. 10, a lens barrel 70 of a fourth embodiment includes a first APD filter 73, a second APD filter 74, a first APD filter 77, and a second APD filter 78, which have variable optical characteristics, instead of the four APD filters of the third embodiment.

Two kinds of materials having different refractive indexes are provided with an interface, which has a variable shape, (variable-shape interface) interposed therebetween, so that each of these four APD filters having variable optical characteristics is formed. Since the shape of the variable-shape interface can be electrically controlled, the optical characteristics of each APD filter can be controlled.

The lens barrel 70 includes a shape changing unit 71 instead of the filter insertion/retreat unit 41 of the third embodiment. The shape changing unit 71 changes the shape of the variable-shape interface of each APD filter. The shape changing unit 71 changes the optical characteristics of each APD filter by changing the shape of each variable-shape interface.

An imaging device body 80 of the fourth embodiment includes a filter control unit 81 instead of the insertion/retreat control unit 51 that is provided in the control section 24 of the imaging device body 50 of the third embodiment. The filter control unit 81 controls the change of the optical characteristics of each APD filter that is performed by the shape changing unit 71. The lens barrel 70 is detachably mounted on the imaging device body 80, and the lens barrel 70 and the imaging device body 80 are used as an imaging device 90 of the fourth embodiment. Since other structures of the fourth embodiment are the same as those of the third embodiment, the detailed description thereof will be omitted.

In the fourth embodiment, it is possible to take the same state as the first insertion state of the third embodiment by setting the optical characteristics of the first and second APD filters 73 and 74 to the same optical characteristics as the optical characteristics of the first and second APD filters 17 and 18 and setting the optical characteristics of the first and second APD filters 77 and 78 to optical characteristics (uniform transmittance) that are obtained while APD filters are not provided.

Further, it is possible to take the same state as the second insertion state of the third embodiment by setting the optical characteristics of the first and second APD filters 77 and 78 to the same optical characteristics as the optical characteristics of the first and second APD filters 37 and 38 and setting the optical characteristics of the first and second APD filters 73 and 74 to optical characteristics (uniform transmittance) that are obtained while APD filters are not provided.

That is, in the fourth embodiment, the same control as the switching of the first and second insertion states of the third embodiment can be electrically performed by the filter control unit 81.

Examples of the lens barrel-interchangeable imaging device have been described in the embodiments, but the invention can also be applied to not a lens-interchangeable imaging device but an integrated imaging device, a mobile phone with a camera, and a smartphone.

EXPLANATION OF REFERENCES 10, 35, 40, 70: lens barrel
12: first lens optical system
13: second lens optical system
16: diaphragm
17, 37: first APD filter
18, 38: second APD filter
20, 50, 80: imaging device body
21: imaging element
30, 60, 90: imaging device
41: filter insertion/retreat unit
51: insertion/retreat control unit
71: shape changing unit
81: filter control unit

What is claimed is:

1. A lens barrel comprising:
a lens optical system that includes a focus lens forming an image with an incident ray;
a diaphragm that changes the amount of the incident ray and emits the incident ray;
two first apodization filters that are disposed on a light-incident side of the diaphragm; and
two second apodization filters that are disposed on a light-emitting side of the diaphragm;
wherein a component of the lens optical system is not present between one set of the first and second apodization filters, and
a component of the lens optical system is present between the other set of the first and second apodization filters.

2. The lens barrel according to claim 1,
wherein the first and second apodization filters have optical characteristics in which light transmittance is reduced toward an outer peripheral portion from an optical axis, and
the optical characteristics of the first apodization filter are the same as the optical characteristics of the second apodization filter.

3. The lens barrel according to claim 1,
wherein a first optical distance between the diaphragm and the first apodization filter is equal to a second optical distance between the diaphragm and the second apodization filter.

4. The lens barrel according to claim 1, further comprising:
a filter insertion/retreat unit that inserts and retreats each of one set of the first and second apodization filters and the other set of the first and second apodization filters.

5. The lens barrel according to claim 1,
wherein each of one set of the first and second apodization filters and the other set of the first and second apodization filters is an apodization filter of which optical characteristics are changed by a change in shape,
the lens barrel further comprising:
a shape changing unit that is provided for each apodization filter and changes the shape of each apodization filter.

6. An imaging device body on which the lens barrel according to claim 1 is detachably mounted, the imaging device body comprising:
an imaging element that generates an imaging signal by photoelectrically converting a ray having passed through the first and second apodization filters.

7. An imaging device comprising:
the lens barrel according to claim 1; and
an imaging device body on which the lens barrel is detachably mounted, the imaging device body including an imaging element that generates an imaging signal by photoelectrically converting a ray having passed through the first and second apodization filters.

* * * * *